W. R. MORRISON.
FASTENING DEVICE FOR TIRES.
APPLICATION FILED OCT. 30, 1911.
1,046,629.
Patented Dec. 10, 1912.
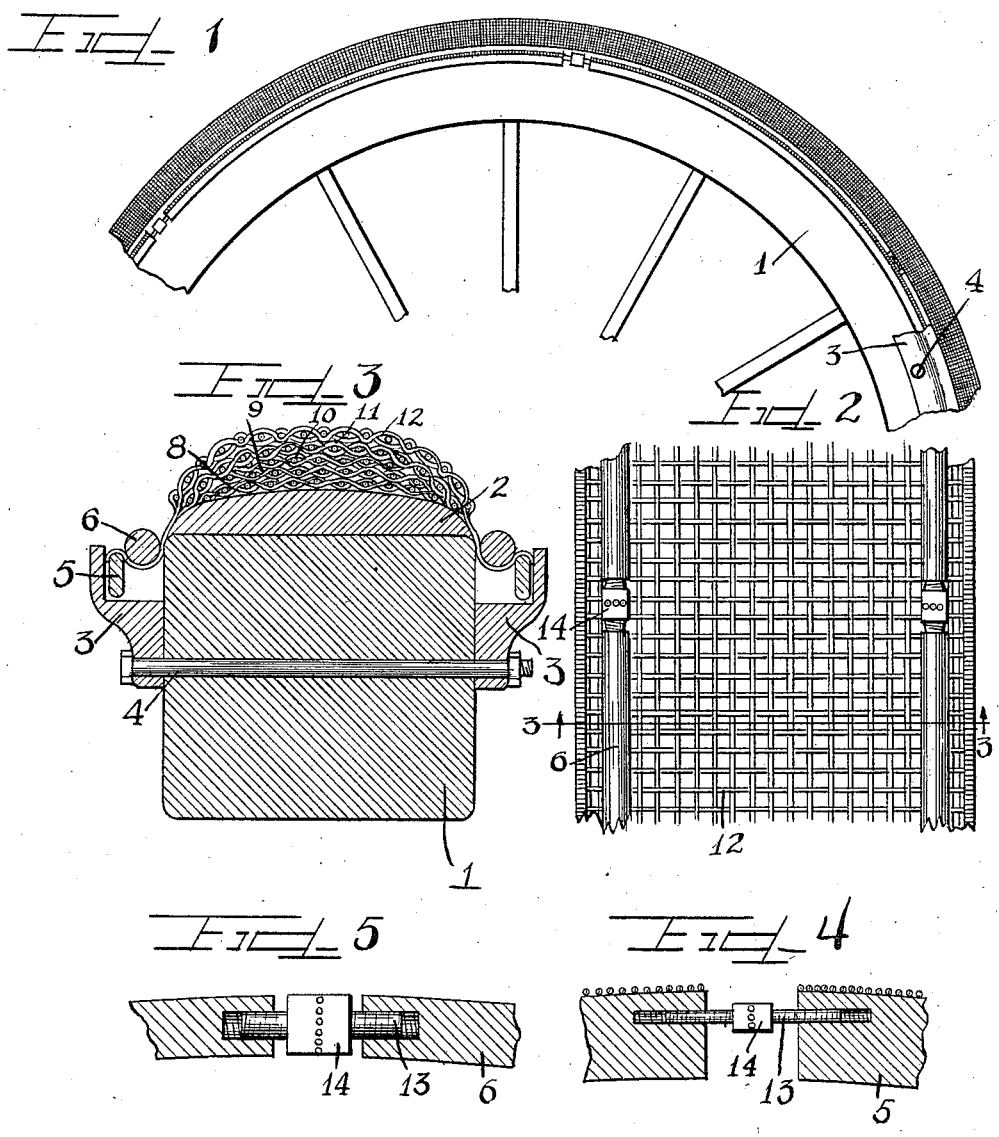

UNITED STATES PATENT OFFICE.

WILLIAM ROBERT MORRISON, OF CHICAGO, ILLINOIS.

FASTENING DEVICE FOR TIRES.

1,046,629.　　　　　　　Specification of Letters Patent.　　Patented Dec. 10, 1912.

Original application filed April 17, 1911, Serial No. 621,476. Divided and this application filed October 30, 1911. Serial No. 657,549.

*To all whom it may concern:*

Be it known that I, WILLIAM ROBERT MORRISON, a citizen of the United States, and a resident of the city of Chicago, in the county of Cook and State of Illinois, have invented certain new and useful Improvements in Fastening Devices for Tires; and I do hereby declare that the following is a full, clear, and exact description of the same, reference being had to the accompanying drawings, and to the numbers of reference marked thereon, which form a part of this specification.

My invention relates to certain new and useful improvements in fastening devices for tires, the same being a division of my application filed April 17, 1911, and bearing the Serial Number 621,476.

It is an important object of this invention to provide a fastening device for tires or tire treads adapted to permit the quick removal of the tires or tire treads from the wheels of a vehicle.

It is also an object of the invention to afford a construction which may be quickly and easily removed for repair by the renewal or replacement of parts, should it become necessary.

It is an object of the invention to afford a tire fastening device adapted for use for trucks and heavy service vehicles and of such a character as to be able to withstand the severe usage to which the tire fastening devices of such vehicles are subjected.

The invention consists in the matters hereinafter described and more fully pointed out and defined in the appended claims.

In the drawings: Figure 1 is a fragmentary side elevation of a wheel partly in section provided with the fastening device embodying my invention. Fig. 2 is an enlarged plan view of the device embodying my invention. Fig. 3 is a section on line 3—3 of Fig. 2. Fig. 4 is a fragmentary sectional view of the outwardly adjustable clamping ring. Fig. 5 is a similar view of the inwardly adjustable clamping ring.

As shown in the drawings: 1, indicates the felly of the wheel; 2, indicates a steel or other rim; 3, indicates annular guard rings bolted on each side the felly by means of transverse bolts 4. Said guard rings are channeled on the inner side adjacent the felly, affording a recess on each side the wheel for the entire circumference thereof and in which are secured the outwardly expanding clamping ring 5, and the inwardly contractible clamping ring 6. Secured on said rim 2, is a tire tread, in this instance constructed as shown and described in my application for patent, Serial No. 611,856, of a plurality of layers 8, 9, 10, 11, and 12, of wire net, constructed of relatively large wire and coated, if desired, with rubber or other resilient material. The transverse strands of the layers 8, 10 and 12, are of a length to extend beyond the sides of the felly and rim and to engage the expanding clamping ring 5, in the guard channel, as shown in Figs. 2 and 6, and are secured thereto in any suitable manner. The contracting clamping ring 6, engages on the extended ends of said transverse strands, as shown in Figs. 2 and 3, and between the expanding clamping ring 5, and the felly. The intermediate layers of net 9 and 11, are arranged respectively between the layers 8 and 10, and the layers 10 and 12, and, as shown, the layer 9, is of greater width than the layer 11, thus affording an arched or convex tread. Said layers are each woven or constructed in endless bands and when fitted on the rim, fit closely thereto, and to each other, and the outermost layer 12, when drawn thereover, as shown in Fig. 3, confines all in operative position.

Each of the clamping rings 5 and 6, is constructed of a plurality of segments, each provided at opposite ends respectively with right and left threaded apertures adapted to receive therein the right and left threaded turn buckle bolts 13, each of which is provided at its center with a head 14, which may be provided with apertures to receive any suitable tool for rotating the same or may be made angular to permit engagement by a suitable wrench.

The operation is as follows: In applying the tire, the guard rings 3, are (or may be) removed from one or both sides of the wheel. The successive bands are drawn about the felly with the extended ends of the transverse wires of alternate bands engaging over the expanding clamping rings 5, in any suitable manner and when all the bands are in place, the contracting clamping band 6, is placed over said protruding ends between the expanding clamping band and the felly, as shown in Figs. 2 and 3, and the respective turn buckle bolts 13, are turned respectively to expand the clamping ring 5, and to contract the clamping ring 6, thereby drawing taut the successive layers affording the tread. The extended ends engaged over the expanding clamping rings 5, may be secured thereto in any suitable manner or may be merely rigidly clamped thereby against the flange of the guard channel, thereby frictionally holding the same against the draft of the contracting expanding ring.

Should the outer layer of the tire become worn, as, of course, it will eventually, it may be removed by simply releasing the respective clamping elements whereby the same is held in place and may be quickly restored after repair, or another may be substituted therefor.

I have shown but one construction embodying my invention, although numerous modifications are obvious. I therefore do not purpose limiting the patent to be granted on this application otherwise than necessitated by the prior art.

I claim as my invention:

1. A tire fastening device in combination with a wheel rim embracing an expansible clamping ring adapted to engage beneath a tire at each side thereof, a contractible clamping ring adapted to engage on the outer side of the tire between said wheel rim and the expanding clamping ring, said clamping rings acting mutually to draw the tire tightly about the wheel, and a guard ring bolted on each side of the wheel partly covering said clamping rings and coöperating in holding the tire in place.

2. A tire fastening device embracing in combination the felly and rim, an expansible clamping ring and a contractible clamping ring between the wheel rim and the expansible clamping ring on each side of said wheel rim, said clamping rings acting mutually to draw a tire tightly about the wheel, and an angled guard ring secured on each side of the wheel and partly covering said clamping rings and coöperating in holding the structure in place.

3. A tire tread fastening in combination with a wheel and a tire thereon, embracing an expansible clamping ring adapted to engage beneath the tire at each side of the wheel, a contractible clamping ring adapted to engage on the outer side of the tire between the wheel rim and the expansible clamping ring, means on said clamping rings to adjust the rings whereby they mutually act to draw the tire tightly about the wheel, and angled guard rings partly inclosing said clamping rings and coöperating in holding the tire in place.

In testimony whereof I have hereunto subscribed my name in the presence of two subscribing witnesses.

WILLIAM ROBERT MORRISON.

Witnesses:
    CHARLES W. HILLS, Jr.,
    GEORGE R. MOORE.

Copies of this patent may be obtained for five cents each, by addressing the " Commissioner of Patents Washington, D. C."